Oct. 7, 1952      H. ST. PIERRE      2,612,670
TIRE CHAIN TIGHTENER
Filed Oct. 17, 1949
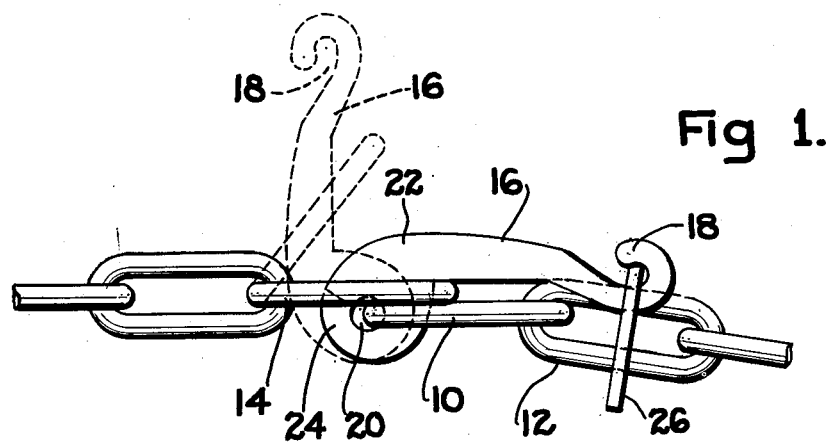
Fig 1.
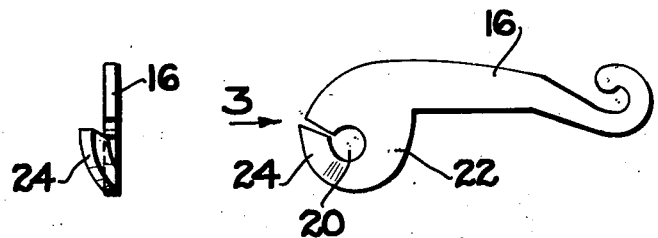
Fig. 3      Fig. 2
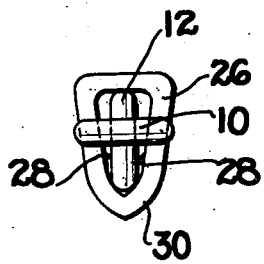      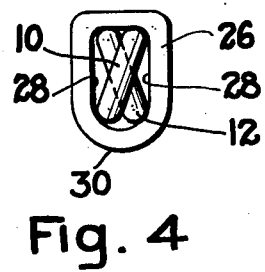
Fig. 5      Fig. 4
*INVENTOR.*
HENRY ST. PIERRE
BY
Charles R. Foy, atty.

Patented Oct. 7, 1952

2,612,670

UNITED STATES PATENT OFFICE 2,612,670

TIRE CHAIN TIGHTENER

Henry St. Pierre, Worcester, Mass.

Application October 17, 1949, Serial No. 121,873

5 Claims. (Cl. 24—69)

This invention relates to a chain tightener and the principal object of the invention resides in the provision of a device of the class described which is extremely simple in nature, easy to operate, positive in action, and cheap to manufacture.

Another object is the provision of a chain takeup tightener comprising a single flat pressed metal part and a keeper or slider, the latter comprising a closed frame disposed in sliding relation on the second link of a chain to be tightened and being assembled so that it cannot escape therefrom after having been positioned thereon.

A further object of the invention resides in the provision of a flat pressed metal chain takeup device embodying an elongated member having a hook at one end and a bendable tab at the other end forming an eye, said tab being bent laterally from a position out of the plane of the body member down to the plane thereof to close the eye and insure positive locking thereto of the end link of a chain to be tightened.

Other objects and advantages of the invention will appear hereinafter.

Reference is to be had to the accompanying drawings in which

Fig. 1 is a view in elevation of a device shown in chain tightened condition in solid lines and in part-way open condition in dotted lines;

Fig. 2 is a view in side elevation of a device with the tab open;

Fig. 3 is an end view of the device of Fig. 2 looking in the direction of arrow 3;

Fig. 4 is a view in elevation of the keeper or slider illustrating the manner in which the same is applied to the chain; and Fig. 5 is a view similar to Fig. 4 but showing the slider after it has been assembled.

As shown in Fig. 1, there is an end link of a chain indicated at 10, the same being assembled with a second link 12 of a chain which terminates in an end link 14 at the opposite end of the chain. The end link 10 is pivotally attached to a takeup device 16 comprising a flat pressed metal elongated body having a hook 18 at one end and an eye 20 at the other end, the eye being located in an enlargement 22 and formed by a tab 24 which is bent out of the general plane of the takeup device 16 so that the link 10 may be slid in thereto and then the tab 24 is bent back into the plane of the body 16 so as to securely and permanently trap the link 10 therein in pivotal relation thereto.

The keeper or slider comprises a closed frame 26 stamped out to have generally parallel inside edges 28 spaced far enough apart so as to be slipped over both link 10 and link 12 when the same are arranged as shown in Fig. 4; after which the end of the slider indicated at 30 in Fig. 4 is pinched at one end so as to bring the edges 28 in toward each other making them appear in a converging relation, see Fig. 5; in which case no matter how the link 10 is moved with relation to link 12, the slider cannot escape over link 10.

In the operation of the device, it is merely necessary to thread part 16 through the end link 14, see the dotted line showing in Fig. 1, and then move the member 16 in a clockwise direction, the enlargement 22 camming the link 16 to the right to tighten the chain. When the hook 18 reaches a position in alignment with links 12, the slide 26 is moved thereover as is well understood by those familiar with the art, and the member 16 is released, whereupon the tension of the chain is such as to tend to open member 16, i. e., pull it counterclockwise so that naturally the slide maintains the member 16 in locked condition at all times until the member 16 is pivoted down to a slight extent and the slider released therefrom to allow the member 16 to open.

Reference is hereby made to co-pending applications Serial No. 121,872 and Serial No. 121,874, both filed October 17, 1949.

Having thus described my invention and the advantages thereof, I do not wish to be limited to the details herein disclosed, otherwise than as set forth in the claims, but what I claim is:

1. A device of the class described comprising a hook, means to attach a chain link thereto at a point remote from the hook bight, a chain link secured by said means, a chain connected to the link, an apertured closed slider on a link of the chain, said hook bight being engageable and held by the slider, the slider aperture being elongated and having a wide part to receive the hook and a narrow part preventing escape of the slider from the link on which it is placed, the links each having a width slightly less than the length of the aperture.

2. A device of the class described comprising a hook, means to attach a chain link thereto at a point remote from the hook bight, a chain link secured by said means, a chain connected to the link, a closed apertured slider on a link of the chain, said hook bight being engaged and held by the slider, the aperture being elongated and having a wide end to receive the hook and a narrow end part preventing escape of the slider from the link on which it is placed, the links each having a width slightly less than the length of the aperture, said slider being generally triangular in form.

3. A device of the class described comprising a length of chain of substantially identical welded non-twisted chain, a hook on an end link of the chain, a closed apertured slider on the second link at the other end of the chain, leaving an end link unencumbered at the slider end of the chain length, the aperture in the slider being elongated and wider at one end than the other end thereof by reception of the hook, and having a length slightly greater than the width of the links, the narrower end of the slider receiving one link only, so that the unencumbered end link cannot pass the slider.

4. A device of the class described comprising a length of chain of substantially identical welded non-twisted chain, a hook on an end link of the chain, a closed apertured slider on the second link at the other end of the chain, leaving an end link unencumbered at the slider end of the chain length, the aperture in the slider being elongated and wider at one end than the other end thereof for reception of the hook, and having a length slightly greater than the width of the links, the narrower end of the slider having a width less than double the width of a run of a link.

5. A device of the class described comprising a length of chain of substantially identical welded non-twisted chain, a hook on an end link of the chain, a closed apertured slider on the second link at the other end of the chain, leaving an end link unencumbered at the slider end of the chain length, the aperture in the slider being elongated and wider at one end than the other end thereof by reception of the hook, and having a length slightly greater than the width of the links, the narrower end of the slider having a width slightly greater than the thickness of a link.

HENRY ST. PIERRE.

REFERENCES CITED

The following references are of record in the file of this patent:

UNITED STATES PATENTS

| Number | Name | Date |
|---|---|---|
| 1,399,646 | Oppman | Dec. 6, 1921 |
| 1,420,949 | Schindler | June 27, 1922 |
| 1,860,695 | Stahl et al. | May 31, 1932 |
| 2,153,002 | Reyburn | Apr. 4, 1939 |
| 2,444,513 | Kostelny | July 6, 1948 |